United States Patent
Kanie

(10) Patent No.: US 7,036,875 B2
(45) Date of Patent: May 2, 2006

(54) METHOD FOR ATTACHING UNDERCOVER ONTO UNDERSIDE OF CAR FLOOR PANEL

(75) Inventor: Hideki Kanie, Nissin (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/972,362

(22) Filed: Oct. 26, 2004

(65) Prior Publication Data

US 2005/0052056 A1    Mar. 10, 2005

Related U.S. Application Data

(62) Division of application No. 10/406,442, filed on Apr. 4, 2003, now Pat. No. 6,824,203.

(30) Foreign Application Priority Data

Apr. 5, 2002    (JP) ............................ 2002-103469

(51) Int. Cl.
   *B60J 7/00*    (2006.01)
(52) U.S. Cl. ............... 296/204; 296/29; 296/39.1; 411/175
(58) Field of Classification Search ........... 296/204, 296/29, 97.9, 39.1, 180.1; 411/173, 112, 411/175; 52/217, 241, 489.2, 481.1
   See application file for complete search history.

(56) References Cited

U.S. PATENT DOCUMENTS

| | | | |
|---|---|---|---|
| 2,560,961 A | 7/1951 | Friedrich | 411/173 |
| 4,286,642 A * | 9/1981 | Keatley | 411/112 |
| 4,577,450 A * | 3/1986 | Large | 52/787.12 |
| 4,729,706 A * | 3/1988 | Peterson et al. | 411/112 |
| 4,755,090 A | 7/1988 | Macfee et al. | 411/174 |
| 4,837,942 A | 6/1989 | Watts | 33/666 |
| 4,848,089 A | 7/1989 | Cramer | 411/523 |
| 4,897,005 A | 1/1990 | Peterson et al. | 411/175 |
| 5,039,264 A | 8/1991 | Benn | 411/175 |
| 5,168,604 A * | 12/1992 | Boville | 24/297 |
| 5,373,611 A | 12/1994 | Murata | 24/297 |
| 5,465,928 A | 11/1995 | Massie | 248/27.1 |
| 5,507,545 A | 4/1996 | Krysiak | 296/97.9 |
| 5,513,893 A * | 5/1996 | Nakata et al. | 296/208 |
| 5,533,781 A * | 7/1996 | Williams | 296/204 |
| 5,567,098 A | 10/1996 | Gordon | 411/48 |
| 5,599,148 A * | 2/1997 | Hirose | 411/112 |
| 5,632,584 A | 5/1997 | Acevedo | 411/182 |
| 5,674,023 A | 10/1997 | Williams | 403/231 |
| 5,707,192 A | 1/1998 | Vortriede et al. | 411/175 |
| 5,934,729 A | 8/1999 | Baack | 296/39.1 |
| 6,308,476 B1 * | 10/2001 | Nakamoto et al. | 52/217 |
| 6,394,537 B1 * | 5/2002 | DeRees | 296/29 |

(Continued)

FOREIGN PATENT DOCUMENTS

JP    59-129676    8/1984

(Continued)

*Primary Examiner*—Kiran B. Patel
(74) *Attorney, Agent, or Firm*—Miles & Stockbridge P.C.

(57) ABSTRACT

An apparatus and method for attaching an undercover to the underside of a car body floor panel having a plurality of studs, comprises tubular fasteners that are inserted into respective mounting holes of the undercover with diametral clearance and that are engaged with the studs. Each fastener comprises clips coupled to one another and having flanges that exert a predetermined clamping force on the undercover while permitting displacement of the undercover along the floor panel due to thermal deformation.

9 Claims, 9 Drawing Sheets

U.S. PATENT DOCUMENTS

| | | | |
|---|---|---|---|
| 6,435,298 B1 * | 8/2002 | Mizuno et al. | 296/180.1 |
| 6,533,487 B1 | 3/2003 | Clark | 411/45 |
| 6,715,812 B1 | 4/2004 | Sakuma et al. | 296/1.02 |
| 6,722,730 B1 * | 4/2004 | Lydan et al. | 296/29 |
| 6,726,273 B1 * | 4/2004 | Kruschhausen et al. | 296/204 |

FOREIGN PATENT DOCUMENTS

| | | |
|---|---|---|
| JP | 62-59311 | 4/1987 |
| JP | 7-41035 | 7/1995 |
| JP | 8-1091 | 7/1996 |

* cited by examiner

METHOD FOR ATTACHING UNDERCOVER ONTO UNDERSIDE OF CAR FLOOR PANEL

CROSS REFERENCE TO RELATED APPLICATIONS

This application is a divisional of application Ser. No. 10/406,442 filed Apr. 4, 2003 now U.S. Pat. No. 6,824,203. This application also claims the benefit of Japanese Patent Application No. 2002-103469, both incorporated herein by reference.

BACKGROUND OF THE INVENTION

The present invention relates to an apparatus and method for attaching an undercover to the underside of a floor panel of a car body. In particular, the present invention relates to an undercover attaching apparatus and method using studs fixed at predetermined positions on the underside of a floor panel of a car body, mounting holes formed in an undercover to receive the respective studs therein, and stud-engaging fasteners attached to the undercover in respective mounting holes.

It is well known to attach an undercover to the underside of a floor panel of a car body, for example, as disclosed in Japanese Utility Model Laid-Open No. 59-129676. In one technique of attaching an undercover to the underside of a floor panel of a car body, a plurality of threaded studs are fixed at predetermined positions of the underside of the floor panel, and a plurality of mounting holes are formed at predetermined positions of the undercover to receive the respective studs therein. Then, the undercover is positioned to the underside of the floor panel to insert the studs into the corresponding mounting holes, and nuts are screwed onto the respective studs with a tool or the like to complete an operation for attaching the undercover to the underside of the floor panel. This operation is troublesome and time-consuming because of the need for fastening a number of nuts to the studs over a large area of the undercover.

Further, when the undercover is attached to the underside of the floor panel by tightly screwing the nuts onto the threaded studs to prevent the undercover from dropping off, a fastening stress is concentrated on the fastened regions. The undercover is commonly a panel made of plastic material, which tends to expand and contract due to temperature changes during engine running and cooling down. Since the undercover is tightly fastened by the nuts at predetermined positions, it is subject to being distorted by thermally-induced stress around the fastened regions. This problem could be avoided if reliable attachment of an undercover could be achieved while allowing the attached undercover to be displaced along the underside of the floor panel to permit thermal expansion and contraction.

Japanese Utility Model Laid-Open No. 62-59311 (Japanese Utility Model Publication No. 3-19603) discloses an attaching assembly for attaching a panel such as an insulating panel, but not an undercover. In this attaching assembly, a tubular member is disposed around a stud in advance to position a panel, and a clip is engaged with the stud, so that the clip can be coaxially attached to the stud to maintain a high fixing force stably. If this attaching assembly were used to attach an undercover, it would be necessary to perform a troublesome operation of attaching a plurality of tubular members to corresponding studs in advance, and there would be no assurance of avoiding thermally-induced distortions.

Japanese Utility Model Laid-Open No. 7-41035 (Japanese Utility Model Registration No. 2584386) discloses a two-component clip for attaching a flexible panel such as a trim panel to a car body. In this clip, a first component has a hollow shank into which a hollow base of a second component is previously fitted to assemble the first and second components together, and the resulting assembly is inserted into and attached to the flexible panel from one side thereof. If this clip were applied to an undercover, however, it could not be inserted into the undercover from one side thereof, because the undercover has a high rigidity and is different from a flexible trim panel.

Japanese Utility Model Laid-Open No. 8-001091 (Japanese Utility Model Registration No. 2577997) discloses a two-component clip for attaching a panel to a car body. This clip comprises a male component with a flange and a female component with a flange. The male and female components are inserted into a mounting hole of the panel from opposite sides of the panel, respectively, to couple them together so as to clamp the panel therebetween. Then, the clip is engaged with a stud to fix the panel to the car body. There is no suggestion in Japanese Utility Model Laid-Open No. 8-001091 of applying this clip to the attachment of undercovers. In addition, Japanese Utility Model Laid-Open No. 8-001091 does not include any suggestion of a structure that would avoid thermally-induced distortion.

BRIEF DESCRIPTION OF THE INVENTION

It is therefore an object of the present invention to provide an undercover attaching apparatus and method that facilitate attaching an undercover and that allow the attached undercover to be desirably displaced along the underside of a floor panel due to thermal expansion and contraction, thereby avoiding thermally-induced distortion.

According to the present invention, studs are fixed at predetermined positions of the underside of a floor panel, mounting holes are formed in the undercover to receive the studs therein, and tubular fasteners are attached to the undercover in the mounting holes. Then, the fasteners are engaged with respective studs.

In one non-limiting embodiment of the invention, the fastener comprises a first clip including an outer tubular portion adapted to be inserted into the mounting hole of the undercover; and a second clip including an inner tubular portion adapted to be inserted into the outer tubular portion of the first clip, and an engagement member such as a pawl or pawls adapted to be engaged with the stud. The first clip is formed with a first flange adapted to be brought into contact with one side of the undercover when the outer tubular portion is inserted into the mounting hole; the second clip is formed with a second flange adapted to be brought into contact with the other surface of the undercover when the inner tubular portion is inserted into the outer tubular portion; and the outer and inner tubular portions are formed with first and second coupling portions for coupling the outer and inner tubular portions to one another, whereby when the outer tubular portion is inserted into the mounting hole of the undercover and then the inner tubular portion is inserted into the outer tubular portion to couple the first and second clips together by the coupling portions, the first and second flanges are brought into contact with respective sides of the undercover around the periphery of the mounting hole to clamp the undercover therebetween. The mounting hole of the undercover has a diameter substantially larger than the outer diameter of the outer tubular portion, providing diametral clearance that allows the undercover to be displaced along the underside of the floor panel due to its thermal deformation, and the first and second clips are formed to allow the first and second flanges to clamp the undercover therebetween with a predetermined clamping force capable of clamping the undercover without its wobbling movement in the axial direction of the stud while allowing the undercover to be displaced along the underside of the floor panel due to thermal deformation.

In the preferred method of the invention, the fasteners are fastened to the undercover in advance of installing the undercover on a floor panel, making it possible to readily carry the undercover with the fasteners held thereon. Thus, the undercover can be attached to the underside of the floor panel of a car body by a simple attaching operation of properly positioning the undercover with the fasteners to the underside of the floor panel and then pressing the undercover to the underside of the floor panel while inserting the studs into the fasteners. Further, the first and second clips are formed so that the first and second flanges clamp the undercover therebetween with a predetermined clamping force that prevents wobbling movement of the undercover in the axial direction of the studs while allowing the undercover to be displaced along the underside of the floor panel due to its thermal deformation, and thereby to eliminate distortion of the undercover around the studs.

Preferably, the studs are threaded studs, and in one embodiment the second clip includes the inner tubular portion having a stud engagement pawl or pawls formed in the inside thereof; the second flange is formed at one of the ends of the inner tubular portion, and a polygonal tubular portion extends from the second flange as an extension of the inner tubular portion. This polygonal tubular portion may be formed as a tubular body having an inner diameter greater than the outer diameter of the thread of the stud, so as to allow the polygonal tubular portion to be free from engagement with the thread of the stud. The polygonal tubular portion can be rotated about the axis of the stud by a tool, so as either to provide tighter fastening of the engagement pawl on the stud or to release the fastening.

The second flange may have an outer edge formed to extend toward the other end of the inner tubular portion so as to allow the second flange to be brought into contact with one side of the undercover only at the outer edge, to facilitate maintaining the predetermined clamping force. Further, the first flange may have a flat plate shape capable of being brought into contact with the other surface of the undercover in its entirety.

Furthermore, a portion of the outer tubular portion may be divided by axially extending slits to form a first coupling portion of the first clip, and the outer surface of the inner tubular portion can be formed with a second coupling portion adapted to be engaged with the first coupling portion. The first and second coupling portions are formed to allow the first and second flanges to be spaced apart from each other by an axial distance equal to or slightly less than the thickness of the undercover so as to provide a predetermined clamping force when the first and second coupling portions are engaged with one another.

In a second non-limiting embodiment of the invention, the studs may be threaded studs, and the second clip may include the inner tubular portion having a stud-engagement pawl or pawls formed in the inside thereof; the second flange may be formed at one of the ends of the inner tubular portion, and a polygonal tubular portion may extend from the second flange as an extension of the inner tubular portion. This polygonal tubular portion has an inner diameter less than the outer diameter of the thread of the stud, so as to allow the polygonal tubular portion to be engaged with the thread of the stud. The polygonal tubular portion can be rotated about the axis of the stud by a tool, so as to allow the polygonal tubular portion to be threaded by the stud and to be either threadedly engaged with the stud or to release the threaded engagement with the stud. According to this embodiment, the stud-engagement pawl of the second clip can be used for a temporary fastening, and a tight final fastening can be achieved by a combination of the engagement of the stud-engagement pawl and the threaded engagement of the polygonal tubular portion.

The first flange may be formed at one of the ends of the outer tubular portion of the first clip. This first flange preferably has an outer edge formed to extend toward the other end of the outer tubular portion so as to allow the first flange to be brought into contact with one side of the undercover only at the outer edge to facilitate maintaining the predetermined clamping force. The second flange may have a flat plate shape capable of being brought into contact with the other surface of the undercover in its entirety.

Further, a portion of the outer tubular portion may be divided by axially extending slits to form a first coupling portion of the first clip for engaging a second coupling portion of the second clip. The first and second coupling portions are formed to allow the first and second flanges to be spaced apart from one another by an axial distance equal to or slightly less than the thickness of the undercover so as to provide a predetermined clamping force when the first and second coupling portions are engaged with one another.

Furthermore, the inner tubular portion of the second clip may have an axial length which allows the first flange to be brought into contact with the underside of the floor panel and allows the second flange to press the undercover, when an end of the inner tubular portion is brought into contact with the underside of the floor panel by the rotation of the polygonal tubular portion. According to this structure, the undercover can be firmly attached to the underside of the floor panel while limiting the clamping force to within a certain range that allows the undercover to be displaced along the underside of the floor panel due to thermal deformation.

BRIEF DESCRIPTION OF THE DRAWINGS

The invention will be further described in conjunction with the accompanying drawings which show preferred (best mode) embodiments, and wherein.

DETAILED DESCRIPTION OF THE INVENTION

Figure 1:
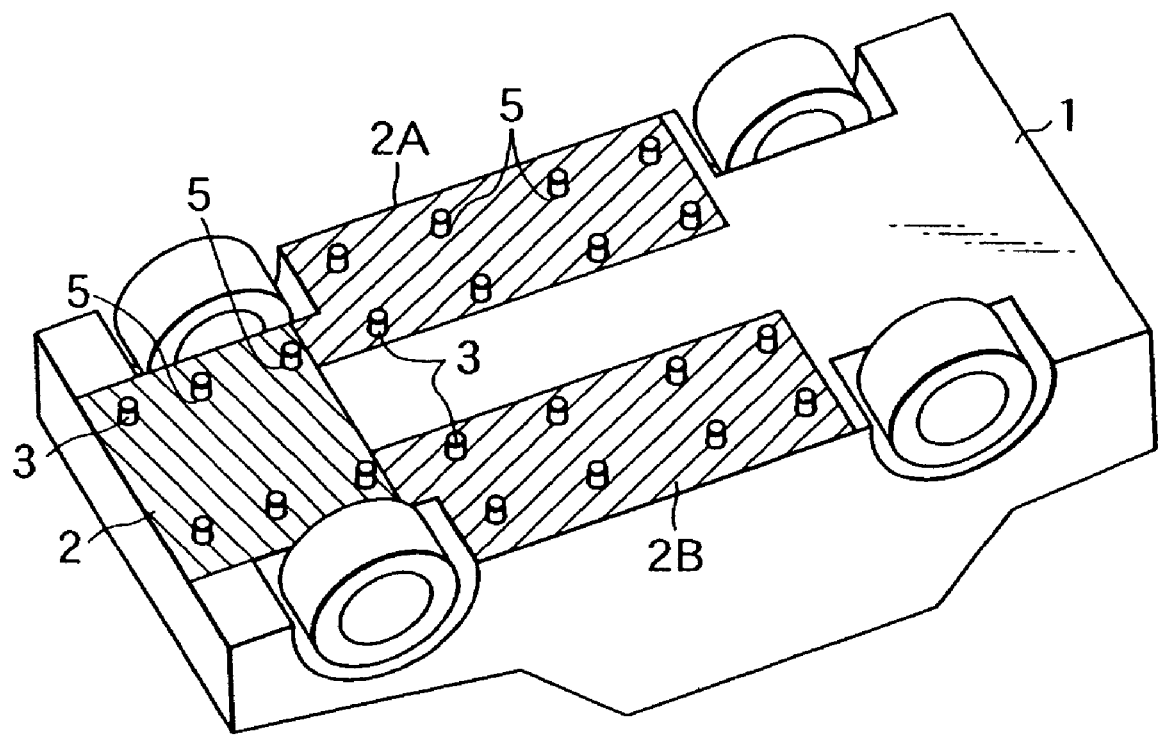
FIG. 1 is a perspective view showing the underside of a floor panel of a car body and undercovers.

Embodiments of the present invention will now be described with reference to the drawings. FIG. 1 shows several kinds of undercovers 2, 2A and 2B, more particularly undercover panels, to be attached to the underside 1 of a floor panel of a car body. For attaching the undercovers 2, 2A and 2B to a floor panel, a plurality of studs 3 are fixed to the underside 1 of the floor panel at predetermined positions thereof by welding or the like. The studs 3 may be threaded studs having a threaded portion formed in the outer peripheral surface or may be grooved studs having a groove formed in the outer peripheral surface. In the described embodiments, threaded studs are employed for convenience.

A plurality of mounting holes 5 are formed in the undercovers 2, 2A and 2B at predetermined positions in conformity with the respective positions of the studs 3 to allow the studs to be inserted therethrough. One particular mounting hole used at a reference position of the undercover may have a diameter approximately equal to the outer diameter of a stud. In the present invention, the diameter of each of the mounting holes 5 other than the particular mounting hole at the reference position of the undercover is formed substantially larger than the stud and substantially larger than the outer diameter of an outer tubular portion of a stud-engaging fastener of the present invention to allow the undercover to be displaced along the underside of the floor panel due to thermal deformation (contraction or expansion), as described in detail later.

An undercover attaching apparatus according to an embodiment of the present invention comprises fasteners fastened to the undercovers 2, 2A and 2B in the mounting holes 5, and adapted to be engaged with respective studs 3 so as to attach the undercover to the underside 1 of the floor panel. One such fastener according to a first embodiment of the present invention is shown in FIGS. 2 to 12, and another such fastener according to a second embodiment of the present invention is shown in FIGS. 13 to 23.

Figure 2:
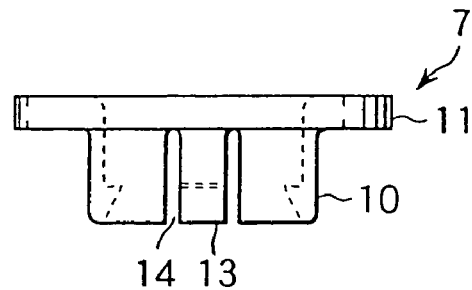
FIG. 2 is a front view of a first clip of a fastener used in undercover attachment according to a first embodiment of the present invention.
Figure 3:
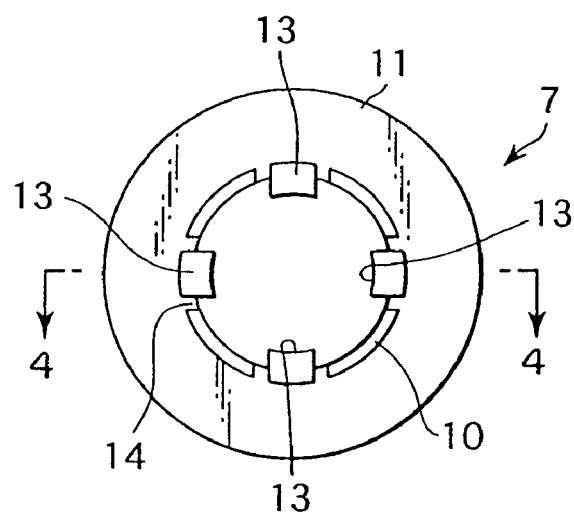
FIG. 3 is a bottom view of the first clip in FIG. 2.
Figure 4:
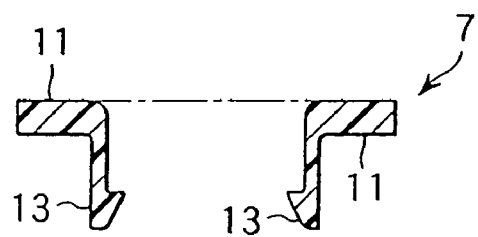
FIG. 4 is a sectional view of the first clip taken along the line 4—4 in FIG. 3.
Figure 8:
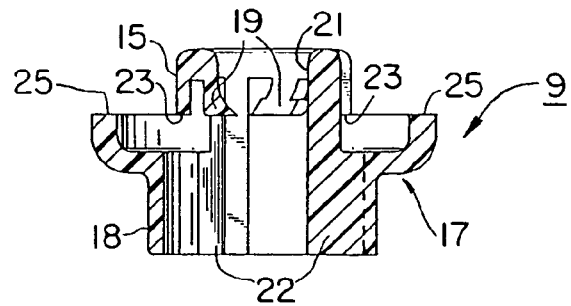
FIG. 8 is a sectional view of the second clip taken along the line 8—8 in FIG. 5.
Figure 9:
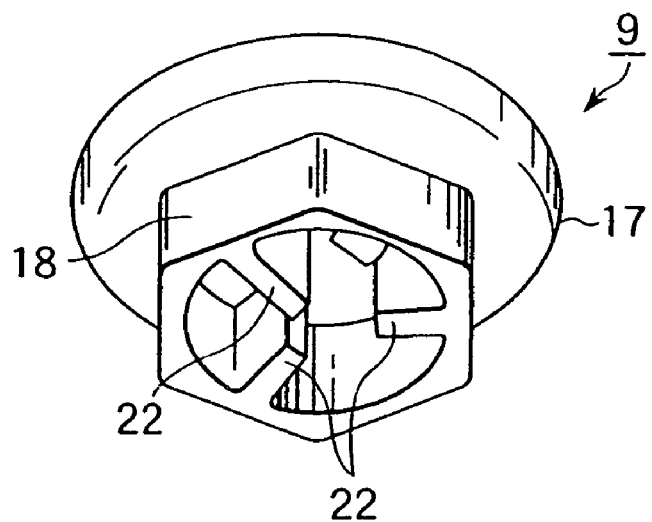
FIG. 9 is a perspective bottom view of the second clip in FIG. 5.
Figure 10:
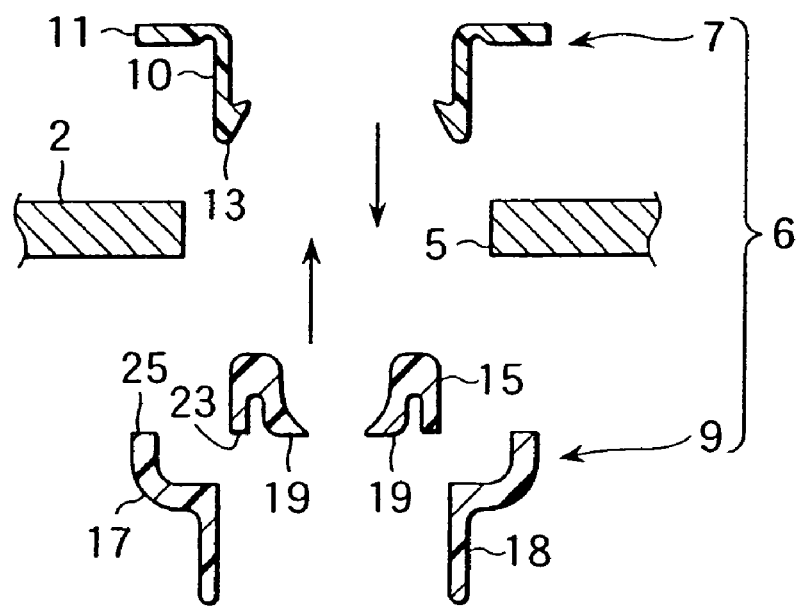
FIG. 10 is a somewhat diagrammatic sectional view showing the condition before the undercover is clamped by the fastener according to the first embodiment.
Figure 11:
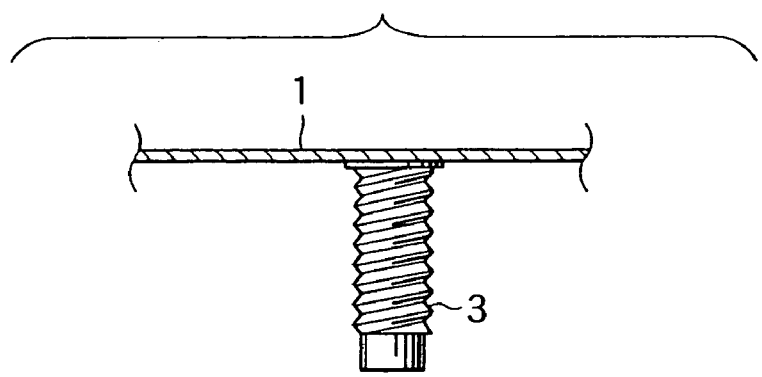
FIG. 11 is a somewhat diagrammatic sectional view showing the condition before the undercover clamped by the fastener according to the first embodiment is attached to the underside of the floor panel of the car body having studs.
Figure 11:
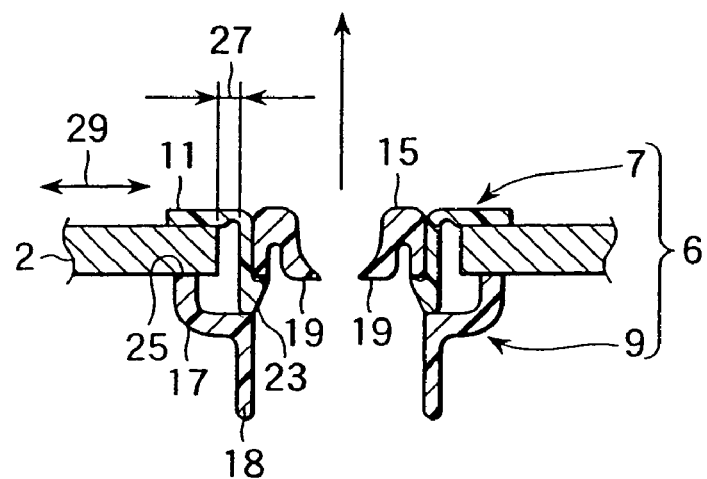
Figure 12:
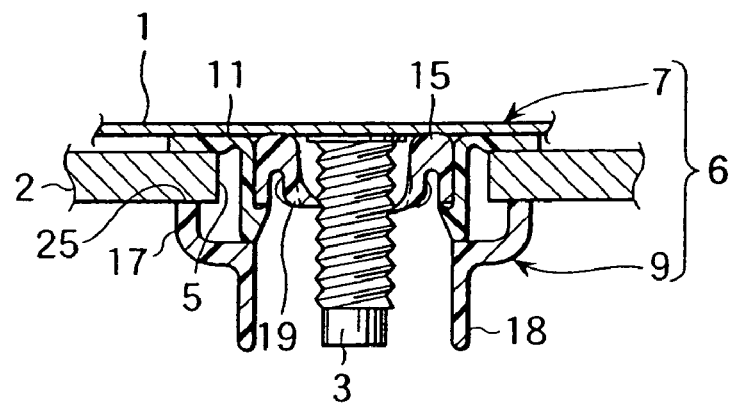
FIG. 12 is a somewhat diagrammatic sectional view showing the condition after the undercover clamped by the fastener according to the first embodiment is attached to the underside of the floor panel of the car body having studs.

In FIGS. 2 to 12, a tubular fastener 6 according to the first embodiment (see FIGS. 10 to 12) comprises a first clip 7, preferably integrally molded of synthetic resin as shown in FIGS. 2 to 4, and a second clip 9, preferably integrally molded of synthetic resin as shown in FIGS. 5 to 9. As shown in FIGS. 10 to 12, the first clip 7 and the second clip 9 are fastened to the undercover 2 (the undercover 2 being selected for the sake of simplicity, but another undercover 2A or 2B may be selected) in such manner that the first and second clips clamp the undercover from its front and rear sides, respectively. The details of the first clip 7 and the second clip 9 will be described with reference to FIGS. 2 to 9.

In FIGS. 2 to 4, the first clip 7 comprises an outer tubular portion 10 adapted to be inserted into the mounting hole of the undercover, and a first flange 11 formed at one of the ends of the outer tubular portion 10 and adapted to be brought into contact with one side of the undercover. The outer tubular portion 10 of the first clip 7 is formed as a hollow cylindrical body having an inner diameter greater than the outer diameter of an inner tubular portion (described later) of the second clip so as to receive the inner tubular portion therein. The outer tubular portion 10 includes a first coupling portion 13 used in coupling the first clip 7 and the second clip 9 to one another. As shown in FIG. 2, a portion of the outer tubular portion is divided by axially extending slits 14 to form the first coupling portion 13, preferably having an elongated elastic-engagement-pawl configuration capable of being readily engaged with a second coupling portion (described later) when the inner tubular portion of the second clip 9 is inserted into the outer tubular portion 10. As shown in FIG. 3, a plurality of first coupling portions 13 are preferably formed to reliably maintain the coupling with the second clip 9. The first flange 11 is preferably formed in a flat circular plate shape capable of being brought into contact with a surface of the undercover in its entirety.

In FIGS. 5 to 9, the second clip 9 comprises an inner tubular portion 15 adapted to be inserted into the outer tubular portion 10 of the first clip 7, a second flange 17 formed at one of the ends of the inner tubular portion 15 and adapted to be brought into contact with the other side of the undercover which is opposite to the first flange 11, and a polygonal (hexagonal in the illustrated embodiment) tubular portion 18 extending from the second flange 17 in the opposite direction with respect to the inner tubular portion 15 as an extension of the inner tubular portion 15. A plurality (three in the illustrated embodiment) of elastic engagement pawls 19 adapted to be engaged with the stud are provided on the inner side of the inner tubular portion 15 at certain intervals in the circumferential direction. The inner tubular portion 15 has an inner diameter allowing the stud to be received therein and an outer diameter capable of being inserted into the outer tubular portion 10. In the illustrated embodiment, the inner tubular portion 15 is formed in a hollow cylindrical shape having a stud receiving hole 21 at the end (the upper end in FIGS. 6 and 8) opposite to the second flange 17, and an opening adjacent to the second flange 17.

Figure 7:
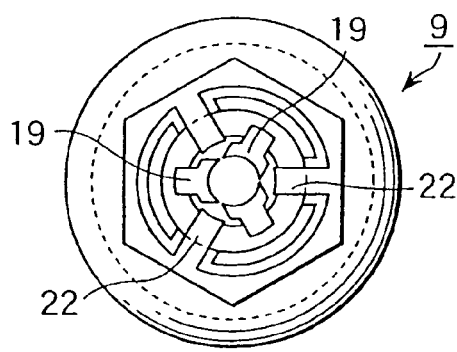
FIG. 7 is a bottom view of the second clip in FIG. 5.

As shown in FIGS. 7 and 9, the inner tubular portion 15 is connected to the second flange 17 and the polygonal tubular portion 18 by means of a plurality (three in the illustrated embodiment) of ribs 22 extending along the inner side of the second clip 9 over its entire axial length. The plurality of ribs 22 define a stud receiving space for receiving a stud inside the second flange 17 and the polygonal tubular portion 18, and allow the axis of the received stud to be aligned with the axis of the second clip 9. Each of the engagement pawls 19 elastically extends toward the inside of the stud receiving space formed by the stud receiving hole 21 and the ribs 22, so as to engage with the threaded portion of the received stud to fasten the second clip 9 to the stud. The plurality of the engagement pawls 19 may have different axial lengths to allow their edges to be offset in conformity with the thread pitch of the stud, respectively. The stud receiving space of the polygonal tubular portion 18 defined by the plurality of ribs 22 is formed to have an inner diameter substantially greater than the outer diameter of the thread of the stud, so as to allow the stud to be received in the stud receiving space defined by the plurality of ribs 22 without any engagement between the thread of the stud and the ribs 22.

The inner tubular portion 15 has a second coupling portion 23 for coupling the second clip 9 to the first clip 7, on the outer periphery thereof adjacent to the second flange 17. As shown in FIG. 8, the second coupling portion 23 is formed as a shoulder extending over approximately the entire circumference of the outer periphery of the inner tubular portion (the shoulder being discontinuous in the regions having the ribs 22 connected to the flange and the polygonal tubular portion 18). When the inner tubular portion 15 is inserted into the outer tubular portion 10 of the first clip 7, the first coupling portion 13 is engaged with the second coupling portion 23 to couple the first clip 7 and the second clip 9 together.

As seen in FIGS. 7 and 9, the polygonal tubular portion 18 formed as a hexagonal tubular body, is used to rotate the entire second clip 9 including the inner tubular portion 15 about the axis of the stud. The inner diameter of the polygonal tubular portion 18 is substantially larger than the outer diameter of the stud so that the polygonal tubular portion 18 is not engaged with the stud. As described above, the plurality of axially extending ribs 22 are formed on the inner side of the polygonal tubular portion 18. Around the axis of the second clip 9, these ribs 22 define the stud receiving space having a diameter which allows the axis of the stud to be aligned with the axis of the second clip 9 but does not allow the thread of the stud to be engaged with the ribs. A tool can be engaged with the polygonal tubular portion 18 to rotate the entire second clip 9 including the inner tubular portion 15 about the axis of the stud so as to provide tighter fastening of the engagement pawls with the stud or to release the fastening.

Figure 5:
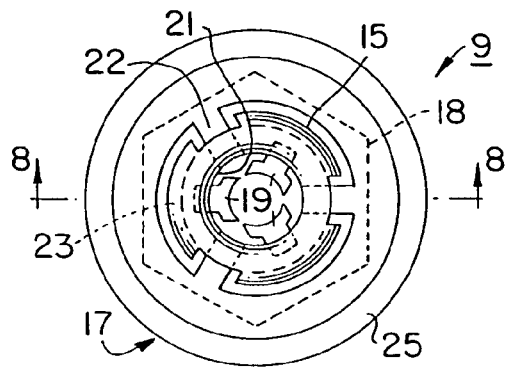
FIG. 5 is a top plan view of a second clip of the fastener used in undercover attachment according to the first embodiment of the present invention.
Figure 6:
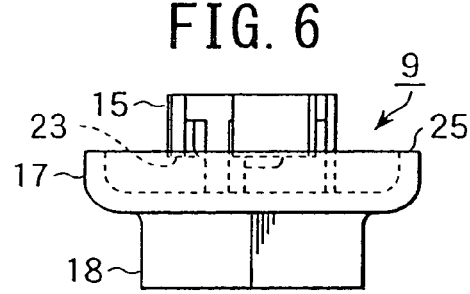
FIG. 6 is a front view of the second clip in FIG. 5.

As shown in FIGS. 5, 6 and 8, the second flange 17 is preferably cup-shaped so that it has a circular-ring-shaped outer edge 25, extending toward the upper end (in FIGS. 6 and 8) of the inner tubular portion 15, to be brought into contact with a surface of the undercover. This shape allows the second flange 17 to be brought into contact with the undercover only at the outer edge 25. On the other hand, the first flange 11 of the first clip 7 is preferably formed in a flat circular plate shape allowing the first flange 11 to be brought into contact with a surface of the undercover in its entirety. The first flange 11 and the second flange 17 can clamp the undercover therebetween while maintaining a predetermined clamping force.

As shown in FIG. 10, the tubular fastener 6 comprises the first clip 7 and the second clip 9. As shown in FIG. 11, the first clip 7 and the second clip 9 of the fastener 6 are coupled with one another while interposing the undercover 2 between the flanges 11 and 17 to clamp the undercover 2 with a predetermined clamping force. This clamping force between the first and second flanges 11 and 17 is set at a level capable of clamping the undercover 2 without its wobbling movement in the axial direction of the stud 3, but allowing the undercover to be displaced along the underside of the floor panel due to its thermal deformation. In order to obtain this clamping force, when the first and second coupling portions 13 and 23 are coupled with one another, a pressing force acting from the first and second flanges 11 and 17 of the first and second clips 7 and 9 to the undercover 2 is selected to allow the first and second flanges to clamp the undercover 2 without its wobbling movement in the axial direction of the stud 3 but not to excessively press the undercover. Further, it is preferred that the first flange 11 is brought into contact with a surface of the undercover 2 in its entirety but that the second flange 17 is brought into contact with a surface of the undercover 2 only at the outer edge 25, to avoid an excessive pressing force and to provide a predetermined clamping force allowing the undercover 2 to be displaced along the underside of the floor panel due to thermal deformation.

An undercover installation operation using fasteners 6, each comprising the first and second clips 7, 9 constructed as described above, will be described with reference to FIGS. 10 to 12. In FIG. 10, the mounting hole 5 of the undercover 2 is formed larger than the outer diameter of the outer tubular portion 10 of the first clip 7 to allow the undercover to be displaced along the underside of the floor panel due to its thermal deformation. The first clip 7 is positioned to allow the outer tubular portion 10 thereof to be inserted into the mounting hole 5 of the undercover 2, and the second clip 9 is positioned to allow the inner tubular portion 15 thereof to be inserted into the outer tubular portion 10 to be inserted into the mounting hole 5. The first clip 7 is pushed to insert the outer tubular portion 10 into the mounting hole 5, and the second clip 9 is pushed to insert the inner tubular portion 15 into the outer tubular portion 10 of the first clip 7. Thus, the undercover 2 is located between the first and second flanges 11, 17. When the first clip 7 and the second clip are pushed toward one another, the first coupling portion 13 of the outer tubular portion 10 of the first clip 7 is slidably moved along the outer side of the inner tubular portion 15 of the second clip 9 to the second coupling portion 23 while being bent by the outer side of the inner tubular portion 15, and the first coupling portion 13 formed as an elastic-engagement-pawl configuration is engaged with the second coupling portion 23 formed as a shoulder configuration. The first clip 7 and the second clip 9 are coupled with one another by the engagement between the first and second coupling portions, and the first and second flanges 11, 17 clamp the undercover 2 with a predetermined clamping force capable of clamping the undercover 2 without its wobbling movement in the axial direction of the stud 3 while allowing the undercover to be displaced along the underside of the floor panel due to thermal deformation.

FIG. 11 shows the condition in which the first and second clips 7, 9 coupled with one another clamp the undercover 2 with a predetermined clamping force capable of clamping the undercover 2 without its wobbling movement in the axial direction of the stud 3 while allowing the undercover to be displaced along the underside of the floor panel due to its thermal deformation. As shown in FIG. 11, when the clips are coupled to one another, the lower edge of the clip 7 may engage the flange 17. Since the first flange 11 is in contact with one side of the undercover 2 in its entirety, but the second flange 17 is in contact with the other side of the undercover 2 only at the outer edge 25, the above predetermined clamping force can be readily maintained. A predetermined gap 27 is provided between the outer diameter of the outer tubular portion 10 of the first clip 7 and the inner diameter of the mounting hole 5 to allow the undercover 2 to be displaced along the underside of the floor panel due to its thermal deformation, as shown by the arrow 29. Other fasteners 6, comprising first and second clips 7, 9 fastened to one another, are attached to the undercover 2 in other mounting holes 5. The undercover 2 having the fasteners can then be transported to a car assembling line or the like.

In FIG. 11, an operator locates the undercover 2 having the fasteners 6 attached thereto at a position allowing each of the plurality of studs 3 fixed at the predetermined positions of the underside 1 of the floor panel of the car body to be received in the inner tubular portion 15 of the second clip 9 of a respective fastener 6. In this operation, the operator is not required to handle or contact the fasteners at all because the fasteners 6 are already attached to the undercover 2. Thus, the operator can concentrate on the operation of positioning of the fasteners of the undercover to the corresponding studs. After the above positioning operation, the undercover 2 is pressed to the underside 1 of the floor panel to insert each stud 3 into an inner tubular portion 15 of a second clip 9. Through this operation, each stud 3 is inserted into an inner tubular portion 15, and the engagement pawl 19 formed inside the inner tubular portion 15 is bent outward to receive the stud 3 in the inner tubular portion. When the undercover 2 is further pressed to the underside 1, the engagement pawl 19 stops sliding and is engaged with the thread root of the stud 3. Through this engagement, the undercover 2 is fixedly attached onto the underside 1 of the floor panel.

FIG. 12 shows the undercover fixedly attached to the underside 1 of the floor panel by a typical fastener 6 comprising the first and second clips 7, 9, and the respective stud 3. As shown, when the undercover is fixedly attached to the underside 1 of the floor panel, the flange 11 can be brought into contact with the floor panel. In FIG. 12, the first and second clips 7, 9 coupled with one another clamp the undercover between the flanges 11 and 17 with a predetermined clamping force capable of clamping the undercover 2 without its wobbling movement in the axial direction of the stud 3 while allowing the undercover to be displaced along the underside of the floor panel due to its thermal deformation. Thus, the undercover is attached to the underside 1 of the car body floor panel having the studs 3 at a proper position while allowing the undercover to be displaced along the underside of the floor panel due to its thermal deformation. Further, the undercover 2 is attached through a simplified operation of positioning and pressing the undercover 2 to the car body. In addition, after pressing the undercover 2 to the car body, a tool such as a spanner or wrench may be engaged with the polygonal tubular portion 18 of the second clip 9 so as to rotate the second clip about the axis of the stud to provide tighter fastening of the engagement pawl 19. The fastening can also be released to detach the undercover 2 from the underside 1 of the floor panel by reversely rotating the polygonal tubular portion 18.

Figure 13:
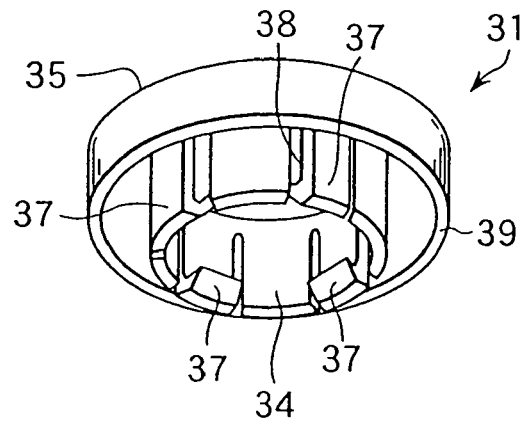
FIG. 13 is a perspective bottom view of a first clip of a fastener used in undercover attachment according to a second embodiment of the present invention.
Figure 14:
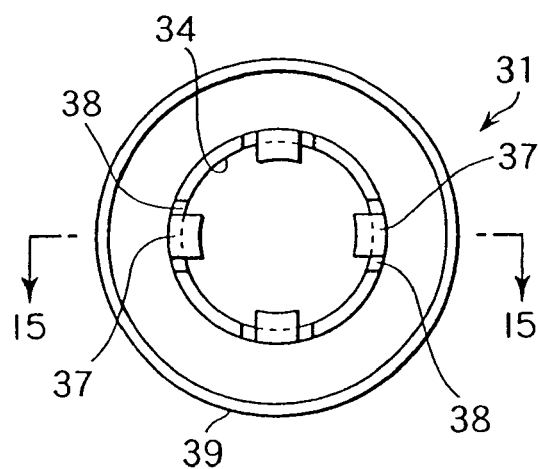
FIG. 14 is a bottom view of the first clip in FIG. 13.
Figure 15:
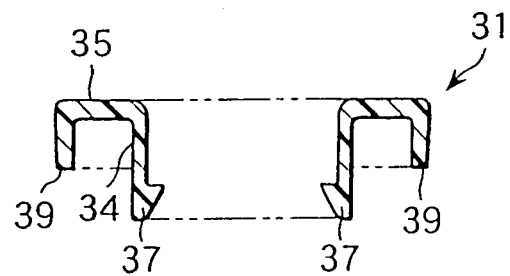
FIG. 15 is a sectional view of the first clip taken along the line 15—15 in FIG. 14.
Figure 16:
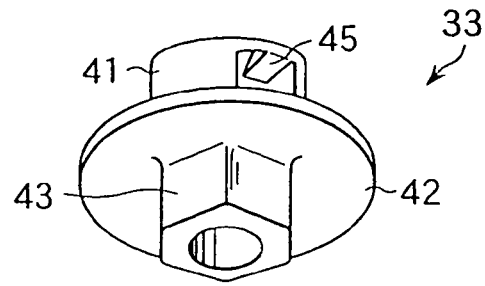
FIG. 16 is a perspective bottom view of a second clip of the fastener used in undercover attachment according to the second embodiment of the present invention.

FIGS. 13 to 23 show a fastener 30 (see FIG. 20) according to the second embodiment. The fastener 30 comprises a first clip 31 preferably integrally molded of synthetic resin as shown in FIGS. 13 to 15, and a second clip 33 preferably integrally molded of synthetic resin as shown in FIGS. 16 to 19. FIGS. 20 to 23 show an operation for fixedly installing the undercover 2 on the underside 1 of the floor panel by using fasteners such as the fastener 30 comprising the first clip 31 and the second clip 33.

In FIGS. 13 to 15, the first clip 31 comprises an outer tubular portion 34 adapted to be inserted into the mounting hole of the undercover, and a first flange 35 formed at one of the ends of the outer tubular portion 34 and adapted to be brought into surface contact with one side of the undercover. The outer tubular portion 34 of the first clip 31 is formed as a hollow cylindrical body having an inner diameter greater than the outer diameter of an inner tubular portion of the second clip 33 so as to receive the inner tubular portion therein. The outer tubular portion 34 includes a first coupling portion 37 used in coupling the first clip 31 and the second clip 33 together. A portion of the outer tubular portion is divided by axially extending slits 38 (FIG. 14) to form the first coupling portion 37 having an elongated elastic-engagement-pawl configuration capable of being engaged with the second coupling portion when the inner tubular portion of the second clip 33 is inserted into the outer tubular portion 34. A plurality of first coupling portions 37 are formed to reliably maintain the coupling with the second clip 33. As illustrated, the first flange 35 is preferably cup-shaped so that it has a circular-ring-shaped outer edge 39 extending toward the lower end (in FIGS. 13 and 15) of the outer tubular portion 34 to be brought into contact with a surface of the undercover. This shape allows the first flange 35 to be brought into contact with the surface of the undercover only at the outer edge 39.

In FIGS. 16 to 19, the second clip 33 comprises an inner tubular portion 41 adapted to be inserted into the outer tubular portion 34 of the first clip 31, a second flange 42 formed at one of the ends of the inner tubular portion 41 and adapted to be brought into contact with the undercover opposite to the side with which the first flange 35 is to be brought into contact, and a polygonal (hexagonal in the illustrated embodiment) tubular portion 43 extending from the second flange 42 in the opposite direction with respect to the inner tubular portion 41 as an extension of the inner tubular portion 41. A plurality (two in the illustrated embodiment) of elastic engagement pawls 45 adapted to be engaged with a stud are provided on the inner side of the inner tubular portion 41 at certain intervals in the circumferential direction. The inner tubular portion 41 has an inner diameter allowing the stud to be received therein and an outer diameter capable of being inserted into the outer tubular portion 34. In the illustrated embodiment, the inner tubular portion 41 is formed in a hollow cylindrical shape having a stud receiving hole 46 at the end (the upper end in FIGS. 17 and 19) opposite to the end having the second flange 42, and a reduced diameter portion on the side of the second flange 42.

Figure 19:
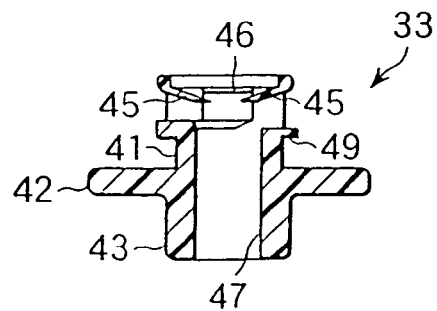
FIG. 19 is a sectional view of the second clip taken along the line 19—19 in FIG. 18.

Each of the engagement pawls 45 elastically extends toward the inside of the stud receiving space of the inner tubular portion 41, so as to engage with the threaded portion of a received stud to fasten the second clip 33 to the stud. The engagement pawls 45 may just have an engaging force strong enough to allow the second clip 33 to be temporarily fastened to the stud 3. As shown in FIG. 19, the polygonal tubular portion 43 is formed as a hexagonal tubular body that is used to rotate the entire second clip 33 including the inner tubular portion 41 about the axis of the stud. The polygonal tubular portion 43 has an inner diameter less than the outer diameter of the thread of the stud, so that it is threaded by the thread of the stud and threadedly engaged with the stud when the polygonal portion 43 is rotated. In the illustrated embodiment, the tubular portion having inner diameter less than the outer diameter of the thread of the stud is not only formed in the polygonal tubular portion 43 but is also extended into a portion of the second flange 42 and the inner tubular portion 41. The small-inner-diameter tubular portion 47 is threadedly engaged with the thread of the stud by the rotation of the polygonal tubular portion 43 to firmly fasten the second clip 33 to the stud.

Figure 17:
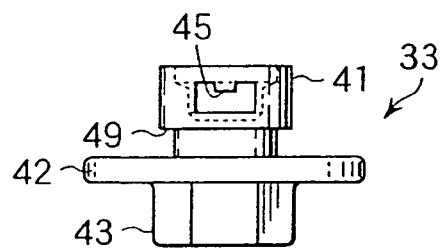
FIG. 17 is a front view of the second clip in FIG. 16.
Figure 18:
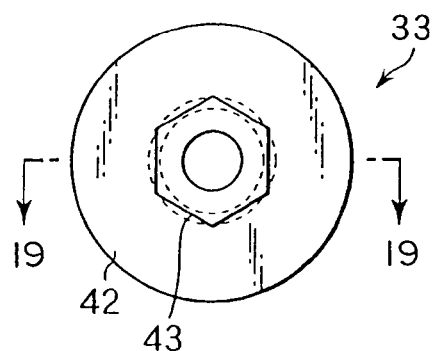
FIG. 18 is a bottom view of the second clip in FIG. 16.

The inner tubular portion 41 includes a second coupling portion 49 for coupling the second clip 33 to the first clip 31, on the outer peripheral surface thereof adjacent to the second flange 42. As shown in FIGS. 17 to 19, the second coupling portion 49 is formed as an engagement shoulder between a large-diameter portion having the engagement pawls 45 and a small-diameter portion adjacent to the second flange 42. When the inner tubular portion 41 is inserted into the outer tubular portion 34 of the first clip 31, the first coupling portion 37 is engaged with the second coupling portion 49 to couple the first clip 31 and the second clip 33 together.

The second flange 42 is preferably formed in a flat circular plate shape allowing the second flange 42 to be brought into contact with a surface of the undercover in its entirety. On the other hand, the first flange 35 of the first clip 31 is preferably formed to extend toward the lower end of the outer tubular portion 34 to allow the first flange 35 to be brought into contact with the surface of the undercover only at the outer edge 39. The respective shapes of the first and second flanges 35, 42 facilitate clamping the undercover 2 with a predetermined clamping force without its wobbling movement in the axial direction of the stud 3, while allowing the undercover to be displaced along the underside of the floor panel due to its thermal deformation. When the first and second coupling portions 37, 49 are coupled with one another, a pressing force acting from the first and second flanges 35, 42 to the undercover 2 is selected to allow the first and second flanges to clamp the undercover 2 without its wobbling movement in the axial direction of the stud 3 but not to excessively press the undercover.

In the fastener 30, the second clip 33 is firmly fastened to the stud 3 by the threaded engagement therewith. The second clip 33 is also formed to be attached to the undercover to maintain the clamping force based on the first and second flanges 35, 42 at a predetermined level capable of clamping the undercover 2 without its wobbling movement in the axial direction of the stud 3 while allowing the undercover to be displaced along the underside of the floor panel due to its thermal deformation. In the second clip 33, the inner tubular portion 41 has an axial length that allows the first flange 35 to be brought into contact with the underside 1 of the floor panel and allows the second flange 42 of the second clip to press the undercover, when the top end (in FIG. 17) of the inner tubular portion 41 is brought into contact with the underside 1 of the floor panel by the rotation of the polygonal tubular portion 43. This axial length is also set to maintain the predetermined clamping force and to prevent the second flange 42 from pressing the undercover with an excessive force greater then the desired predetermined clamping force. Thus, when a tool such as spanner or wrench is engaged with the polygonal tubular portion 43 to threadedly engage the second clip 33 with the stud, the second clip 33 is tightly fastened to the stud 3 to firmly attach the undercover 2 to the underside 1 of the floor panel while limiting the clamping force of the undercover based on the first and second clips to within a certain range to allow the undercover to be displaced along the underside of the floor panel due to thermal deformation.

Figure 20:
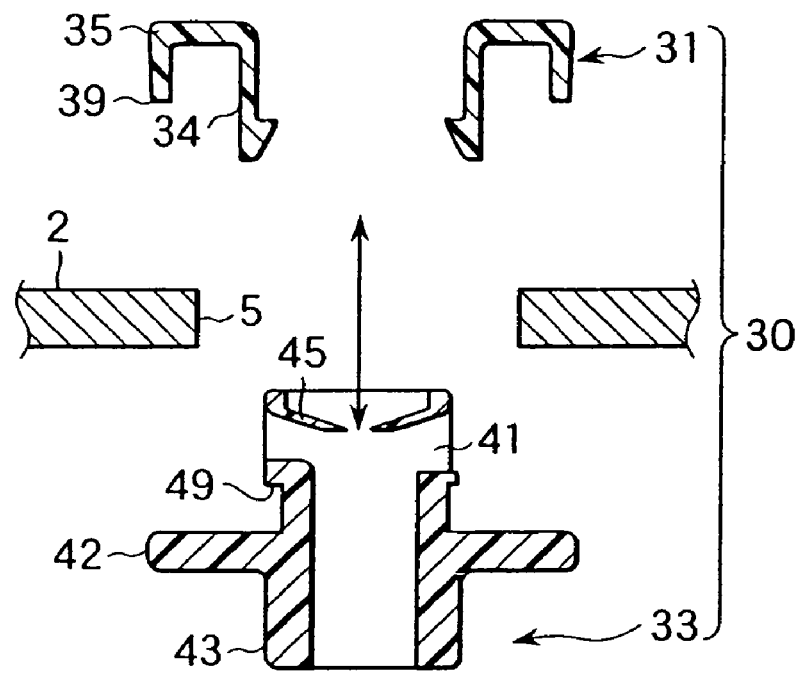
FIG. 20 is a somewhat diagrammatic sectional view showing the condition before the undercover is clamped by the fastener according to the second embodiment.

An undercover installation operation using fasteners 30, each comprising the first and second clips 31, 33, will be described with reference to FIGS. 20 to 23. In FIG. 20, the mounting hole 5 of the undercover 2 is formed larger than the outer diameter of the outer tubular portion 34 of the first clip 31, so as to allow the undercover to be displaced along the underside of the floor panel due to its thermal deformation. The first clip 31 is positioned to allow the outer tubular portion 34 thereof to be inserted into the mounting hole 5 of the undercover 2, and the second clip 33 is positioned to allow the inner tubular portion 41 thereof to be inserted into the outer tubular portion 34 to be inserted into the mounting hole 5. The first clip 31 is pushed to insert the outer tubular portion 31 into the mounting hole 5, and the second clip 33 is pushed to insert the inner tubular portion 41 into the outer tubular portion 34 of the first clip 31. Thus, the undercover 2 is placed between the first and second flanges 35, 42. Then, when the first clip 31 and the second clip are pushed toward one another, the first coupling portion 37 of the outer tubular portion 34 of the first clip 31 is slidably moved along the outer side of the inner tubular portion 41 of the second clip 33 to the second coupling portion 49 while being bent by the outer side of the inner tubular portion 41, and the first coupling portion 37 formed as an elastic-engagement-pawl configuration is engaged with the second coupling portion 49 formed as an engagement-shoulder configuration. The first clip 31 and the second clip 33 are coupled to one another by the engagement between the first and second coupling portions, and the first and second flanges 35, 42 clamp the undercover 2 with a predetermined clamping force capable of clamping the undercover 2 without its wobbling movement in the axial direction of the stud 3 while allowing the undercover to be displaced along the underside of the floor panel due to thermal deformation.

Figure 21:
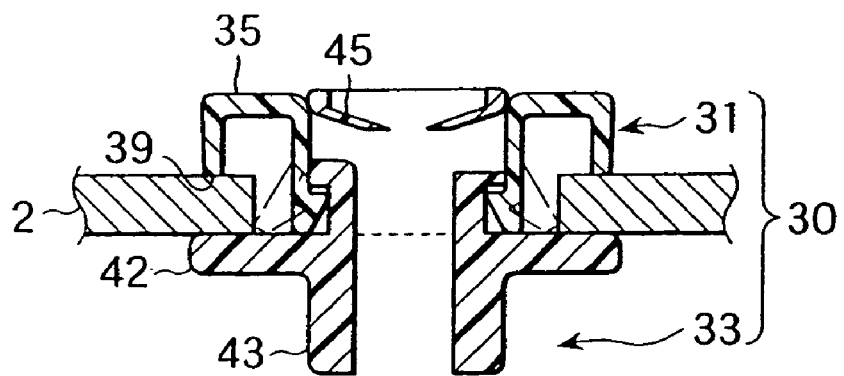
FIG. 21 is a somewhat diagrammatic sectional view showing the condition after the undercover is clamped by the fastener according to the second embodiment.

FIG. 21 shows the condition in which the first and second clips 31, 33 coupled with one another clamp the undercover 2 with a predetermined clamping force capable of clamping the undercover 2 without its wobbling movement in the axial direction of the stud 3 while allowing the undercover to be displaced along the underside of the floor panel due to its thermal deformation. As shown in FIG. 21, when the clips 31 and 33 are coupled to one another, the lower edge of the clip 31 may engage the flange 42 of the clip 33. The second flange 42 is in contact with one side of the undercover 2 in its entirety, but the first flange 35 of the first clip is in contact with the other side of the undercover 2 only at the outer edge 39, to facilitate maintaining the predetermined clamping force. A certain gap is provided between the outer diameter of the outer tubular portion 34 of the first clip 31 and the inner diameter of the mounting hole 5 to allow the undercover 2 to be displaced along the underside of the floor panel due to its thermal deformation. The undercover 2 with the fasteners can then be transferred to a car assembling line or the like.

Figure 22:
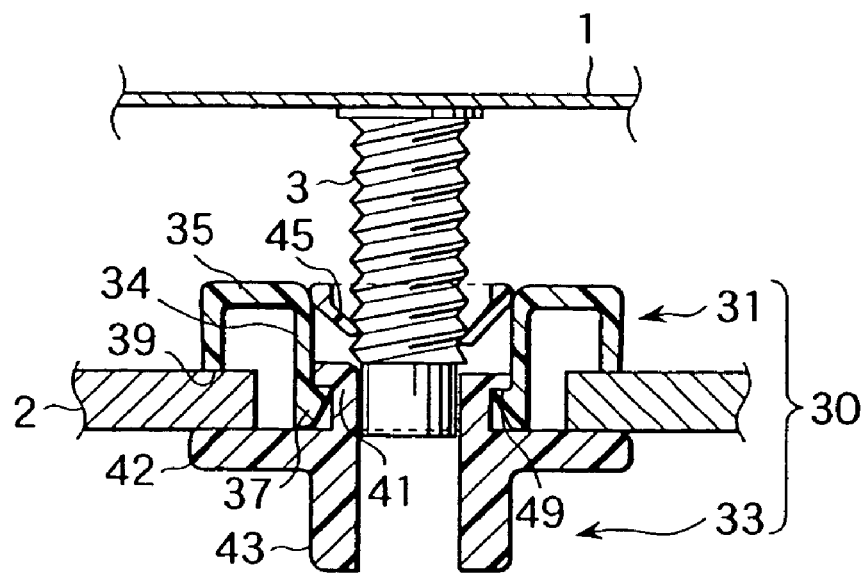
FIG. 22 is a somewhat diagrammatic sectional view showing the condition before the undercover clamped by the fastener according to the second embodiment is attached to the underside of the floor panel of the car body having studs.

In FIG. 22, an operator locates the undercover 2 having the fasteners 30 attached thereto at a position allowing each of the studs 3 fixed at the predetermined positions of the underside 1 of the floor panel of the car body to be received in the inner tubular portion 41 of the corresponding second clip 33. The operator is not required to handle or contact the fasteners at all because the fasteners 30 are already attached to the undercover 2. Thus, the operator can concentrate on the operation of positioning of the undercover. Then, the undercover 2 is pressed to the underside 1 of the floor panel to insert each stud 3 into the respective inner tubular portion 41 of the second clip 33. Through this operation, each stud 3 is inserted into an inner tubular portion 41, and the engagement pawls 45 formed inside the inner tubular portion 41 are bent outward to receive the stud 3 in the inner tubular portion, and engaged with the thread root of the stud 3. Through this engagement, the undercover 2 is initially attached to the underside 1 of the floor panel.

Figure 23:
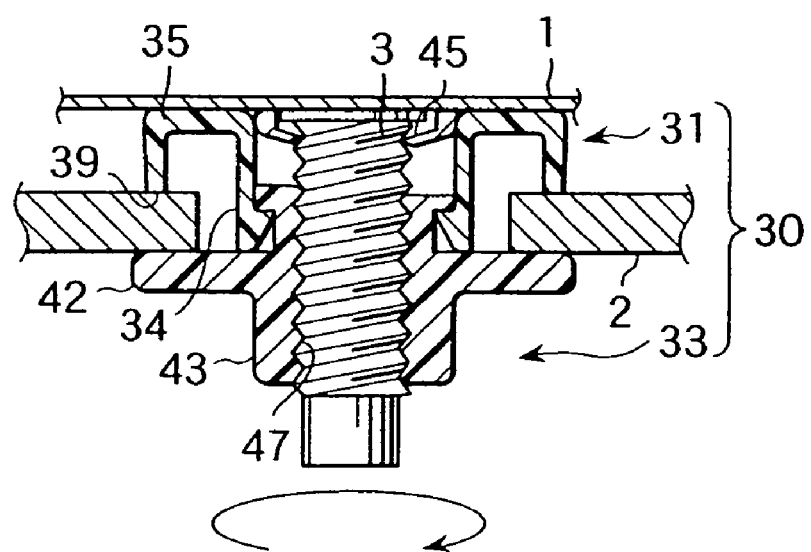
FIG. 23 is a somewhat diagrammatic sectional view showing the condition after the undercover clamped by the fastener according to the second embodiment is attached to the underside of the floor panel of the car body having studs.

FIG. 23 shows a fixedly attached condition. In order to achieve this fixedly attached condition, a tool such as a spanner or wrench is engaged with the polygonal tubular portion 43 of the second clip 33 in the position of FIG. 22 to rotate the second clip 33 about the axis of the stud 3. Through this operation, the small-inner-diameter tubular portion 47 inside the polygonal tubular portion 43 is threaded by the thread of the stud, and the range of the threaded engagement between the stud and the small-inner-diameter tubular portion 47 is gradually increased. The threaded engagement allows the second clip 33 to be tightly fastened to the stud 3 so as to strengthen the temporary fastening based on the engagement pawls 45. In the second clip 33, the axial length of the inner tubular portion 41 is set to allow the first flange 35 to be brought into contact with the underside 1 of the floor panel and allow the second flange 42 to press the undercover, when the top end (in FIGS. 22 and 23) of the inner tubular portion 41 is brought into contact with the underside 1 of the floor panel by the rotation of the polygonal tubular portion 43. This axial length is also set to maintain the predetermined clamping force and prevent the second flange 42 from pressing the undercover with an excessive force greater then the predetermined clamping force. Thus, when a tool such as spanner or wrench is engaged with the polygonal tubular portion 43 to threadedly engage the second clip 33 with the stud, the second clip 33 is tightly fastened to the stud 3 to firmly attach the undercover 2 to the underside 1 of the floor panel while limiting the clamping force on the undercover based on the first and second clips to within a certain range to allow the undercover to be displaced along the underside of the floor panel due to its thermal deformation. The fastening can be released by reversely rotating the polygonal tubular portion 43.

According to the present invention, fasteners can be attached to the undercover in advance, making it possible to readily carry the undercover with the fasteners held thereon. Thus, the undercover can be attached to the underside of the floor panel of the car body through a simple attaching operation of properly positioning the undercover with the fasteners to the underside of the floor panel and then pressing the undercover to the underside of the floor panel while inserting the studs into the fasteners. Further, the first and second clips are formed to allow the first and second flanges to clamp the undercover therebetween with a predetermined clamping force capable of clamping the undercover without its wobbling movement in the axial direction of the studs while allowing the undercover to be displaced along the underside of the floor panel due to thermal deformation. Thus, after installation, the undercover can be displaced along the underside of the floor panel due to thermal deformation to eliminate the risk of distortion of the undercover at the studs.

What is claimed is:

1. A method of installing an undercover on a plurality of studs projecting from a floor panel of a vehicle at a plurality of positions, comprising:
   providing an undercover with a plurality of holes corresponding to the studs, each hole having a diameter substantially greater than the diameter of the corresponding stud;
   providing a plurality of tubular fasteners for receiving corresponding studs, each fastener having a pair of flanges;
   attaching each fastener to the undercover in a corresponding hole with the flanges of the fastener engaging opposite sides of the undercover and with clearance between the fastener and the periphery of the hole, to clamp the undercover between the flanges with a predetermined clamping force but to permit the undercover to move relative to the fastener in a direction along the undercover; and
   inserting the studs into the corresponding fasteners and attaching the fasteners to the studs.

2. A method according to claim 1, wherein each fastener has two tubular portions that are brought together from opposite sides of the undercover, each tubular portion having one of the flanges, and wherein the tubular portions are coupled to one another when they are brought together.

3. A method according to claim 2, wherein the tubular portions are coupled to one another by mutually engageable coupling elements on the respective tubular portions.

4. A method according to claim 2, wherein one of the tubular portions is rotated to secure the attachment of its fastener to a stud.

5. A method according to claim 1, wherein the fasteners are attached to the studs by stud-engagement elements inside the fasteners.

6. A method according to claim 1, wherein the fasteners are attached to the studs so that a flange of each fastener engages the floor panel.

7. A method according to claim 1, wherein the studs are threaded and a portion of each fastener is engaged with the threads of a corresponding stud.

8. A method according to claim 7, wherein the thread engaging portion of each fastener is rotated to adjust the attachment of the fasteners to the studs.

9. A method according to claim 8, wherein the rotation of the thread engaging portion of each fastener causes the corresponding stud to form a thread on the thread engaging portion.

* * * * *